(12) United States Patent
He (10) Patent No.: US 12,353,080 B1
(45) Date of Patent: Jul. 8, 2025

(54) DISPLAY DEVICE

(71) Applicant: Guangzhou China Star Optoelectronics Semiconductor Display Technology Co., LTd., Guangdong (CN)

(72) Inventor: Jiang He, Guangdong (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/778,801

(22) Filed: Jul. 19, 2024

(30) Foreign Application Priority Data

May 28, 2024 (CN) .......................... 202410675088.0

(51) Int. Cl.
*G02F 1/1333* (2006.01)
*G02F 1/1335* (2006.01)

(52) U.S. Cl.
CPC .. *G02F 1/133311* (2021.01); *G02F 1/133331* (2021.01); *G02F 1/133531* (2021.01)

(58) Field of Classification Search
CPC combination set(s) only.
See application file for complete search history.

(56) References Cited

U.S. PATENT DOCUMENTS

| | | | |
|---|---|---|---|
| 2016/0223853 A1 | 8/2016 | Nishimura et al. | |
| 2021/0318572 A1* | 10/2021 | Wang | G02F 1/133528 |
| 2023/0010653 A1* | 1/2023 | Schwager | G02F 1/133325 |
| 2024/0105540 A1* | 3/2024 | Jung | G02F 1/133562 |

FOREIGN PATENT DOCUMENTS

| | | |
|---|---|---|
| CN | 215181289 U | 12/2021 |
| JP | 2010008815 A | 1/2010 |

OTHER PUBLICATIONS

European Office Action issued in corresponding European Patent Application No. 24189261.1 dated Dec. 16, 2024, pp. 1-33.
Japanese Office Action issued in corresponding Patent Application No. 特願 2024-122877 dated Mar. 4, 2025, pp. 1-3.

* cited by examiner

*Primary Examiner* — Phu Vu
(74) *Attorney, Agent, or Firm* — PV IP PC; Wei Te Chung (57) ABSTRACT

Embodiments of the present application discloses a display device in which a support structure is disposed on a side of the opposed substrate away from the array substrate and on a side of the first polarizer close to the edge of the opposed substrate; in a direction perpendicular to the panel surface of the display panel, a distance from a surface of the support structure away from the array substrate to a surface of the opposing substrate away from the array substrate is a first distance, a distance from a surface of the first polarizer away from the array substrate to a surface of the opposing substrate away from the array substrate is a second distance, and the first distance is greater than or equal to the second distance.

9 Claims, 6 Drawing Sheets

DISPLAY DEVICE

CROSS-REFERENCE TO RELATED APPLICATIONS

This application claims priority to Chinese Patent Application No. 202410675088.0 filed on May 28, 2024. The disclosure of the aforementioned application is incorporated herein by reference in its entirety.

TECHNICAL FIELD

The present application relates to display technologies, and more particularly, to a display device.

BACKGROUND

As portable computer products are designed with increasingly narrow bezels, there is an increasing demand for compatibility between the modules and the complete machine cases. Due to factors such as product design tolerances, assembly tolerances, incompatibility issues, particularly the abnormal sounds, are frequently encountered in assembling the narrow bezel product modules and the cases.

In the study and practice of the prior art, the inventors of the present application have found that the cause of the abnormal sounds resulted from the interference between the module and the case is that there is a step difference between a polarizer attached to a color film substrate and a cell tape attached to the color film substrate. Due to the influence of assembly tolerances and the narrow bezel, an overlapping width of the polarizer and the casing is inadequate, and when the complete machine is opened, closed or shaken, an edge of the polarizer and the case scratch each other, thereby generating the abnormal sounds.

SUMMARY

An embodiment of the present application provides a display device, which can reduce the occurrence of abnormal sounds.

An embodiment of the present application provides a display device including:
  a display panel including an array substrate and an opposing substrate disposed opposite to the array substrate;
  a first polarizer disposed on a side of the opposing substrate away from the array substrate;
  a support structure disposed on the side of the opposing substrate away from the array substrate and on a side of the first polarizer close to an edge of the opposing substrate; and
  a front cover disposed on a side of the support structure and the first polarizer away from the array substrate, the front cover covering an edge region of the first polarizer and the support structure;
  wherein in a direction perpendicular to a panel surface of the display panel, a distance from one surface of the support structure away from the array substrate to one surface of the opposing substrate away from the array substrate is a first distance, a distance from one surface of the first polarizer away from the array substrate to the surface of the opposing substrate away from the array substrate is a second distance, and the first distance is greater than or equal to the second distance.

Alternatively, in some embodiments of the present application, wherein the support structure includes a support portion protruding from the first polarizer towards an edge of the opposing substrate in a top view of the display device.

Alternatively, in some embodiments of the present application, wherein a material of the support portion is the same as the first polarizer and the support portion are formed integrally with the first polarizer.

Alternatively, in some embodiments of the present application, wherein the support structure and the first polarizer are provided independently of each other.

Alternatively, in some embodiments of the present application, wherein a distance between the support structure and the first polarizer is less than or equal to 0.15 mm.

Alternatively, in some embodiments of the present application, wherein the support structure includes a support portion and an adhesive layer, and the support portion is attached to the opposing substrate by the adhesive layer.

Alternatively, in some embodiments of the present application, wherein in the top view of the display device, a boundary of the support structure at a side close to the opposing substrate coincides with a boundary of the opposing substrate.

Alternatively, in some embodiments of the present application, wherein in the top view of the display device, a boundary of the support structure at a side close to the opposing substrate is spaced apart from a boundary of the opposing substrate by a vacant space.

Alternatively, in some embodiments of the present application, wherein the display device further includes a cell shielding layer disposed on an outer periphery of the first polarizer, the front cover covers the cell shielding layer, a portion of the cell shielding layer is attached to the side of the opposing substrate away from the array substrate, an avoidance opening is provided on a side of the cell shielding layer close to the first polarizer, and the support structure is provided in the avoidance opening; and
  in the top view of the display device, in a side edge region of the opposing substrate corresponding to the support structure, the cell shielding layer is continuously attached to the opposing substrate through the vacant space.

Alternatively, in some embodiments of the present application, further including a cell shielding layer disposed on an outer periphery of the first polarizer, the front cover covering the cell shielding layer, the cell shielding layer including a first portion attached on the side of the opposing substrate away from the array substrate;
  the support structure includes a support portion integrated on the first portion.

Alternatively, in some embodiments of the present application, wherein the support portion is integrated on a side of the first portion of the cell shielding layer away from the array substrate.

Alternatively, in some embodiments of the present application, wherein the support portion is integrated on a side of the first portion of the cell shielding layer close to the array substrate, and the support structure further includes an adhesive layer connected between the support portion and the opposing substrate.

Alternatively, in some embodiments of the present application, wherein in a top view of the display device, the support portion is elongated and extends along a side direction of the first polarizer.

Alternatively, in some embodiments of the present application, wherein the support structure is located at least on one side of the first polarizer close to a bonding region of the array substrate.

Alternatively, in some embodiments of the present application, wherein the first distance is at most 0.05 mm greater than the second distance.

Alternatively, in some embodiments of the present application, further including a backlight module, a second polarizer, a cell shielding layer, and a bottom case, wherein the second polarizer is disposed on a side of the array substrate away from the opposing substrate, the backlight module is disposed on a side of the second polarizer away from the display panel, the cell shielding layer is disposed on an outer periphery of the first polarizer, one side of the cell shielding layer partially covers the side of the opposing substrate away from the array substrate, and the other side of the cell shielding layer is partially folded to follow a side surface of the backlight module to a back surface of the backlight module;

an accommodating groove is disposed in the bottom case, the backlight module, the display panel and the edge shielding layer are disposed in the accommodating groove, the front cover covers the cell shielding layer, and the front cover is connected to side walls of the bottom case.

Alternatively, in some embodiments of the present application, the front cover includes a cover body and a reinforcing rib, the cover body surrounding the reinforcing rib, the reinforcing rib having a hardness greater than that of the cover body.

Alternatively, in some embodiments of the present application, the material of the support portion is a flexible material, and the elastic modulus of the support portion is between 10 Mpa and 4000 Mpa.

Alternatively, in some embodiments of the present application, the material of the support portion is a hard material and the elastic modulus of the support portion is greater than or equal to 70 Gpa.

A display device according to embodiments of the present invention is provided with a support structure on a side of the opposed substrate away from the array substrate and on a side of the first polarizer close to the edge of the opposed substrate; in a direction perpendicular to the panel surface of the display panel, a distance from a surface of the support structure away from the array substrate to a surface of the opposing substrate away from the array substrate is a first distance, a distance from a surface of the first polarizer away from the array substrate to the surface of the opposing substrate away from the array substrate is a second distance, and the first distance is greater than or equal to the second distance. That is, the display device according to the embodiments of the present invention has an additional support structure arranged on the opposing substrate to support the front cover, so that when the front cover moves relatively, even if the front cover disengages from the first polarizer, the front cover is still supported by the support structure, thereby reducing the likelihood that the front cover and the edge portion of the first polarizer scratch each other.

DETAILED DESCRIPTION

In the following, the technical solutions in the embodiments of the present application will be clearly and completely described in connection with the accompanying drawings in the embodiments of the present application. It will be apparent that the described embodiments are merely a part of the embodiments of the present application, rather than all the embodiments. Based on the embodiments in the present application, all other embodiments obtained by a person skilled in the art without involving any inventive effort are within the scope of the present application. Furthermore, it is to be understood that the specific embodiments described herein are for purposes of illustration and explanation only and are not intended to limit the application. In the present application, if not stated to the contrary, the use of positional terms such as "up" and "down" used generally refer to the up and down of the device in actual use or working condition, specifically the drawing direction in the attached drawings. The terms "inside" and "outside" refer to the frame of the device. The terms "first," "second," "third," and the like are used merely as labels and do not impose numerical requirements or order of establishment.

Figure 1:
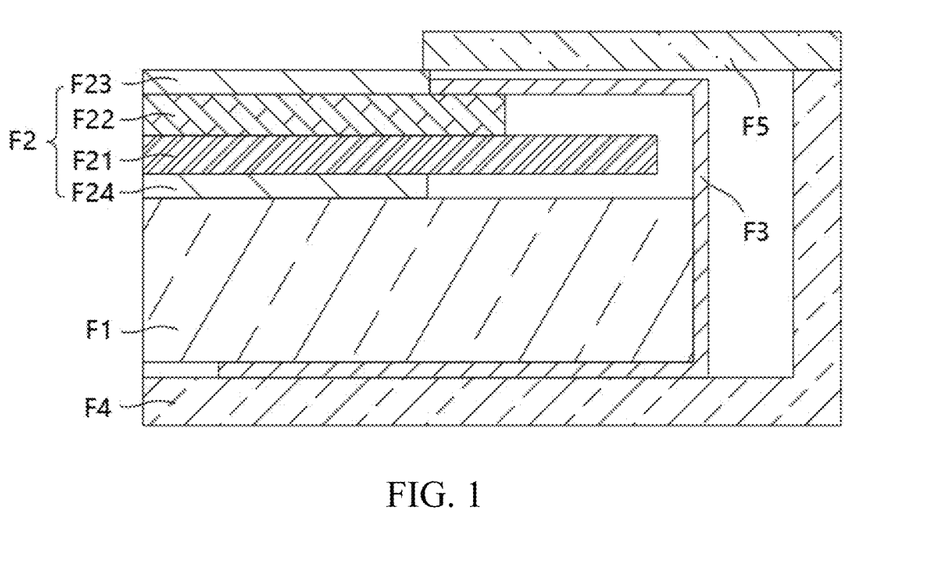
FIG. 1 is a schematic diagram showing structure of the display device in the related art.

In the related art, as shown in FIG. 1, a narrow bezel display device, such as a portable computer, includes a backlight module F1, a display module F2, a cell tape F3, a bottom case F4, and a front case F5. The display module F2 includes an array substrate F21, a color film substrate F22, an upper polarizer F23, and a lower polarizer F24. The upper polarizer F23 is provided on the color film substrate F22, the lower polarizer F24 is provided on the side of the array substrate F21 away from the color film substrate F22, and the cell tape F3 is attached to the side of the color film substrate F22 away from the array substrate F21 and located on one side of the upper polarizer F23, wherein there is a step difference between the upper polarizer F23 and the cell tape F3.

Due to the need for a narrow bezel and the assembly tolerances of the first polarizer and the complete machine, the overlapping width of the front case F5 and the upper polarizer F23 is inadequate. When the complete machine is opened and closed, the upper polarizer F23 and the front case F5 have their edges scratched by each other, thereby generating abnormal sounds.

Figure 2:
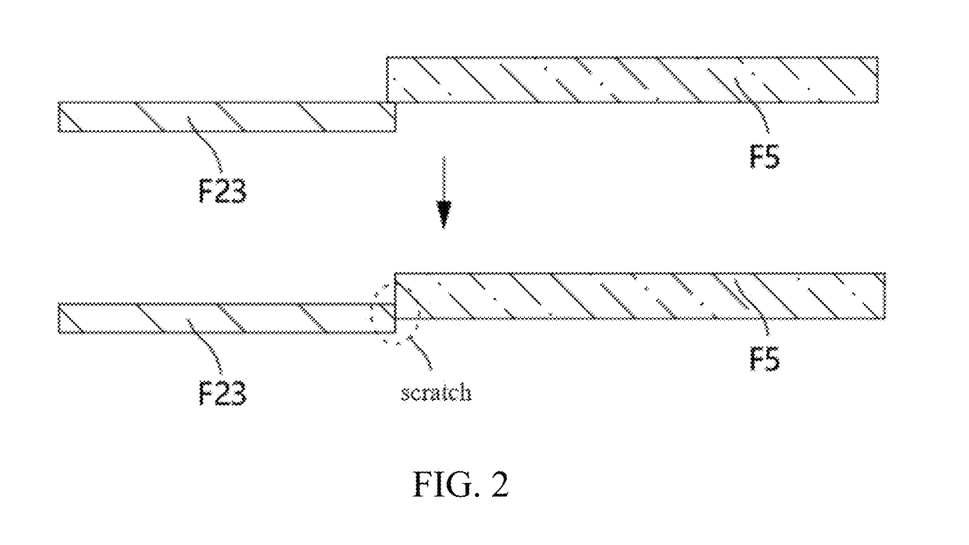
FIG. 2 is a schematic view showing the upper polarizer and the front cover of the display device scratching each other in the related art.
Figure 3:
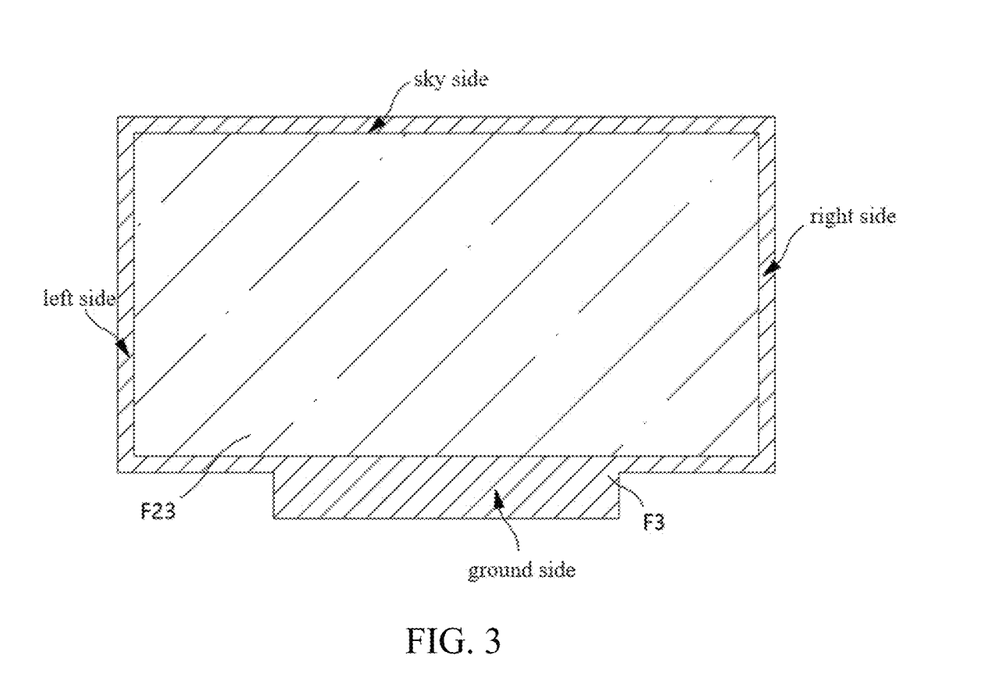
FIG. 3 is a top plan view of the display device in the related art with the front cover and the bottom case removed.

In this case, it should be understood that, since an electronic circuitry such as a flexible circuit board is provided on the ground side of the modules, when the modules and the complete machine are opened/closed, referring to FIGS. 2 and 3, the upper polarizer F23 on the ground side is easily moved relative to the front case F5 of the complete machine because of the flexible circuit board among others on the ground side, and the modules on the other sides (the sky side and the left and right sides) are not easily moved relative to each other, so that the abnormal sounds are frequently generated on the ground side of the modules.

In addition, the shape tolerance of the modules (the backlight module+the display module) is ±0.3 mm, the attachment tolerance of the upper polarizer F23 is ±0.2 mm, the cavity tolerance of the bottom case F4 is ±0.2 mm, the inner diameter tolerance of the front case F5 is ±0.15 mm, and the assembly tolerance of the modules and the bottom case F4 is ±0.5 mm. The root mean square method is applied to obtain: $\sqrt{0.3^2+0.2^2+0.2^2+0.15^2+0.5^2}=\pm 0.66$. In order to ensure that the upper polarizer F23 and the module do not scratch against each other, the designed overlapping width of the front case F5 and the upper polarizer F23 needs to be larger than 0.66 mm, but the designed overlapping width of the front case F5 and the upper polarizer F23 is usually smaller than 0.66 mm due to the attachment requirements of the narrow bezel and the cell tape.

In order to solve the above-mentioned technical problem, the display device according to the embodiment of the present invention supports is provided with an additional support structure on the opposing substrate to support the front cover, so that when the front cover moves relative to other structures, even if the front cover disengages from the first polarizer, the front cover is still supported by the support structure, thereby reducing the likelihood that the front cover and the edge portion of the first polarizer scratch each other.

An embodiment of the present application provides a display device, which is described in detail below. It should be noted that the order in which the following embodiments are described is not intended to define the preferred order of the embodiments.

Figure 4:
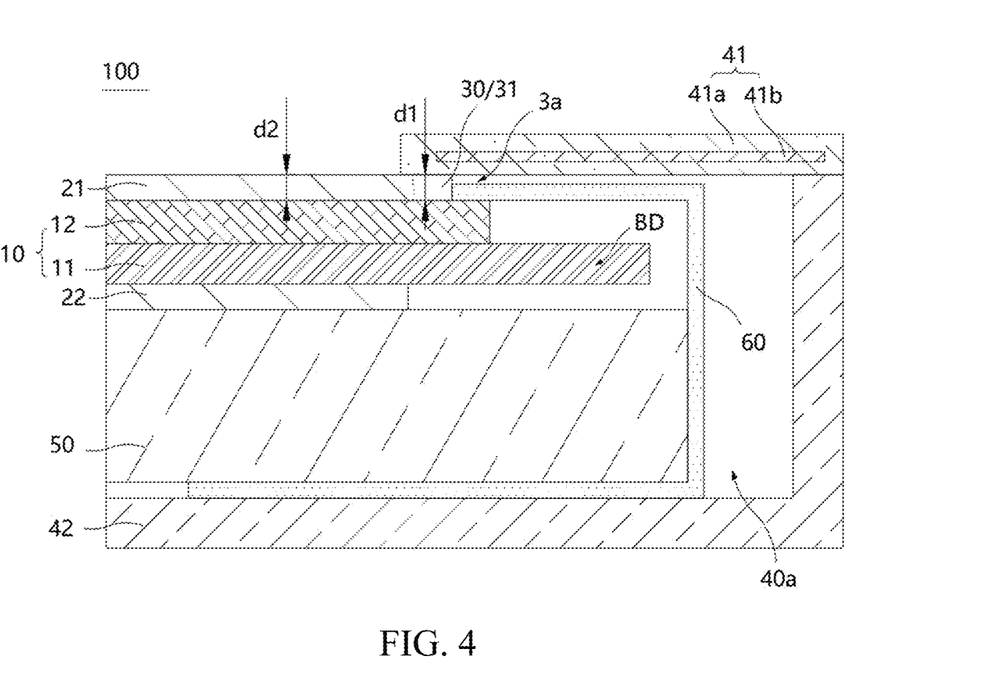
FIG. 4 is a schematic diagram showing structure of the display device according to an embodiment of the present application.
Figure 5:
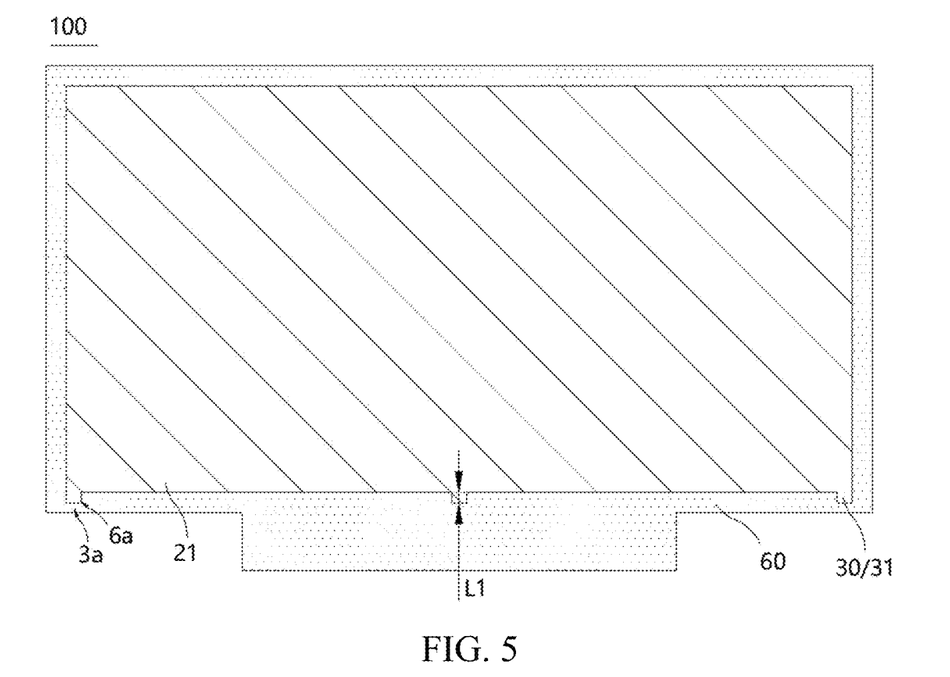
FIG. 5 is a top plan view of the display device with the front cover and the bottom case removed according to an embodiment of the present application.

Referring to FIGS. 4 and 5, which show a display device 100 according to an embodiment of the present application. The display device 100 will be described in the case where it is applied to a portable computer, but the embodiments are not limited thereto. For example, in addition to a portable computer, the display device 100 may be applied to a cellular phone, a tablet personal computer (PC), a personal digital assistant (PDA), a portable multimedia player (PMP), a television, a game machine, a wrist-worn electronic device, a head mounted display, a display of a personal computer, a smart phone, a vehicle navigator, a vehicle dashboard, a digital camera, a camera, an outdoor billboard, an electronic display panel, a medical device, an examination device, various household appliances such as a refrigerator and a washing machine, or an Internet of Things device. Hereinafter, detailed embodiments will be described with reference to the accompanying drawings.

The display device 100 may have a rectangular shape in a top plan view, but the embodiment is not limited thereto. For example, the display device 100 may have a rectangular shape with vertical corners or rounded corners in the top plan view, or may have other shapes. The display device 100 may include two short sides and two long sides in the plan view.

The display device 100 includes the display panel 10, the first polarizer 21, the support structure 30, and the front cover 41.

The display panel 10 includes the array substrate 11 and the opposing substrate 12 disposed opposite the array substrate 11. The first polarizer 21 is disposed on a side of the opposing substrate 12 away from the array substrate 11. The support structure 30 is disposed on the side of the opposing substrate 12 away from the array substrate 11 and located on the side of the first polarizer 21 close to the edge of the opposing substrate 12. The front cover 41 is disposed on one side of the support structure 30 and the first polarizer 21 away from the array substrate 11, and covers the edge region of the first polarizer 21 and the support structure 30.

In the direction perpendicular to the panel surface of the display panel 10, the distance between the side of the support structure 30 away from the array substrate 11 and the side of the opposing substrate 12 away from the array substrate 11 is a first distance d1, and the distance between the side of the first polarizer 21 away from the array substrate 11 and the side of the opposing substrate 12 away from the array substrate 11 is a second distance d2. The first distance d1 is greater than or equal to the second distance d2.

The direction perpendicular to the panel surface of the display panel 10 is the thickness direction of the display panel 10.

The display device 100 according to the embodiment of the present application is provided with a support structure 30 on the opposing substrate, wherein the first distance d1 is greater than or equal to the second distance d2, that is, the support structure 30 is higher than or flush with the first polarizer 21 to support the front cover 41, so that when the front cover 41 and the first polarizer 21 are relatively moved, even if the front cover 41 is separated from the first polarizer 21, the front cover 41 is still supported by the support structure 30, thereby reducing the likelihood that the front cover 41 and the edge portion of the first polarizer 21 scratch each other.

It will be appreciated that the higher the support structure 30, that is, the greater the first distance d1, the farther the front cover 41 is from the first polarizer 21 in the thickness direction of the display panel 10, and the lower the likelihood that the front cover 41 and the first polarizer 21 scratch each other when they move relatively.

Alternatively, the first distance d1 is at most 0.05 mm greater than the second distance d2. For example, the difference between the first distance d1 and the second distance d2 may be 0.05 mm, 0.04 mm, 0.03 mm, 0.02 mm, 0.01 mm, or 0 mm.

The difference between the first distance d1 and the second distance d2 is set to be 0.05 mm or less, so as to reduce the gap width between the first polarizer 21 and the front cover 41, and improve the overall flatness and sealing effect of the display device 100. When the first distance d1 is equal to the second distance d2, the support structure 30 is flush with the first polarizer 21, and the overall flatness, sealability and stability of the display device 100 are best.

In some embodiments, in order to improve the protective performance of the first polarizer 21, the protective layer may be integrated on the first polarizer 21 to form the composite-type first polarizer 21.

Alternatively, in some embodiments, an additional protective layer is provided on the side of the first polarizer 21 away from the opposing substrate 12, the edges of the protective layer being flush with the first polarizer 21. Based on this, the first distance d1 is greater than the second distance d2, and the support structure 30 may be flush with or slightly higher than the protective layer.

Alternatively, the protective layer may be a cover plate or a hardened layer.

In addition, it should be noted that the support structure 30 is fixedly provided on the side of the opposing substrate 12, and the support structure 30 can be flexibly provided according to the opposing substrate 12 with a different size and shape, so that the support structure 30 in this arrangement is more adaptable than that secured on the front cover 41, and the likelihood that the support structure 30 interferes the assembly is reduced.

Alternatively, the support structure 30 has a support length L1 in the direction of the short side, the support length L1 being greater than 0.06 mm. Further, the support length L1 is greater than or equal to 0.66 mm.

It should be understood that when the designed overlapping length of the front cover 41 and the first polarizer 21 is 0.6 mm, the tolerance of 0.66 mm can be overcome as long as the support length L1 is larger than 0.06 mm due to the requirement of assembly tolerance. Based on this, the support length L1 of the support structure 30 can be appropriately adjusted according to the designed overlapping length of the front cover 41 and the first polarizer 21.

In the embodiment of the present application, the front cover 41 covers the edge region of the first polarizer 21, this means that the front cover 41 may cover the edge region on at least one side of the first polarizer 21, for example, the front cover 41 may cover the edge region on the peripheral, i.e., the four sides of the first polarizer 21, may cover the edge region on the adjacent three sides, may cover the edge region on the adjacent two sides, or may cover the edge region on the single side. Here, for example, the front cover 41 of the present application covers the edge region on the four sides of the first polarizer 21.

In one embodiment of the present application, the front cover 41 includes reinforcing rib 41*b* and a cover body 41*a* surrounding the reinforcing rib 41*b*, and the reinforcing rib 41*b* has a hardness greater than that of the cover body 41*a*.

In this case, the reinforcing rib 41*b* having a relatively large hardness is provided in the cover body of the front cover 41 to improve the stiffness of the front cover 41. When the front cover 41 and the first polarizer 21 are relatively moved due to the opening and/or closing operation, the front cover 41 with good rigidity is not prone to sagging deformation, so that the likelihood that the front cover 41 and the first polarizer 21 scratch each other in the vertical direction is reduced.

Alternatively, the material of the reinforcing rib 41*b* may be a hard material such as an alloy.

In some embodiments, the front cover 41 may also be formed of plastic or metal alloy alone, or from other materials.

For example, the front cover 41 may also be formed of a mixed material including resin material mixed hard particles in some embodiments. The front cover 41 with the mixed hard particles has strong rigidity, so that the likelihood that the front cover 41 and the first polarizer 21 scratch each other due to a vertical misalignment therebetween can be reduced, and the abrasion resistance of the front cover 41 can be increased. In addition, due to the addition of the hard particles, the outer surface of the front cover 41 is a frosted surface, so that the specular reflection can be reduced. Alternatively, the hard particles may be ceramic particles, quartz particles or of other materials.

The display panel 10 is a liquid crystal display panel. The liquid crystals are disposed between the array substrate 11 and the opposing substrate 12. The opposing substrate 12 is a color film substrate, that is, a color film layer is integrated on the opposing substrate 12. In some embodiments, the color film layer may also be integrated on the array substrate 11.

The array substrate 11 includes a cell-forming region and a bonding region BD disposed opposite to the opposing substrate 12. The bonding region BD is located outside the opposing substrate 12. The bonding region BD is used for wire bonding with a circuit board, and the circuit board provides related signals to the display panel 10.

The display device 100 further includes a backlight module 50 and a second polarizer 22 disposed on a side of the array substrate 11 away from the opposing substrate 12. The backlight module 50 is provided on the side of the second polarizer 22 away from the display panel 10.

The backlight module 50 provides backlight for the display panel 10. The backlight module 50 may be a direct-lit backlight or an edge-lit backlight.

The display device 100 further includes a cell shielding layer 60 provided on the outer periphery of the first polarizer 21. One side of the cell shielding layer 60 partially covers one side of the opposing substrate 12 away from the array substrate 11, and the other side the cell shielding layer 60 is partially folded to follow the side surface of the backlight module 50 all the way to the back surface of the backlight module 50.

Alternatively, the cell shielding layer 60 may be a black tape (cell tape), a light shielding tape having an electromagnetic shielding function, or another member having a light shielding effect.

Alternatively, the first polarizer 21 is provided in the middle region of the opposing substrate 12 so that the peripheral edge portion of the opposing substrate 12 is exposed. A portion of the cell shielding layer 60 covers and is attached to the peripheral edge portion of the opposing substrate 12. However, the embodiments of the present application are not limited thereto. For example, in some embodiments, the first polarizer 21 may be flush with the side surface of the opposing substrate 12, in which case the cell shielding layer 60 is attached to the side surface of the opposing substrate 12 or the exposed region of the array substrate 11. That is, the edge covering shielding layer 60 is not provided on the light emitting surface of the opposing substrate 12.

The display device 100 further includes a bottom case 42 in which an accommodating groove 40*a* is provided. The backlight module 50, the display panel 10, and the cell shielding layer 60 are disposed in the accommodating groove 40*a*, the front cover 41 covers the cell shielding layer 60, and the front cover 41 is attached to the side wall of the bottom case 42.

In one embodiment of the present application, the support structure 30 is located at least on the side of the first polarizer 21 close to the bonding region BD of the array substrate 11.

Since the display device 100 most likely has abnormal sounds generated on the ground side, the support structure 30 is provided at least in a region on the ground side, so that the likelihood that the front cover 41 and the first polarizer 21 scratch each other can be minimized, thereby reducing the occurrence of the abnormal sounds.

It will be appreciated that the provision of the support structure 30 in regions where the scratch most likely to occur minimizes the occurrence of the abnormal sounds. The support structure 30 may then be provided around the opposing substrate 12 in order to reduce the occurrence of the abnormal sounds overall. Also, the more area occupied by the support structure 30, the lower the likelihood of the abnormal sounds being generated.

Alternatively, in one embodiment of the present application, the support structure 30 includes a support portion 31. In the top view (FIG. 5) of the display device 100, the support portion 31 extends and protrudes from the first polarizer 21 towards the edge of the opposing substrate 12.

It will be appreciated that the support portion 31 extends from the first polarizer 21, that is, the support portion 31 is connected to the first polarizer 21, so that the planar spacing between the support structure 30 and the first polarizer 21 is 0, thereby further reducing the likelihood that the front cover 41 and the edge of the first polarizer 21 scratch each other. At the same time, tolerances in assembling the support structure 30 and the first polarizer 21 separately can be avoided, that is, the support portion 31 is integrally assembled with the first polarizer 21, thereby improving assembly convenience.

Alternatively, the support portion 31 is formed integrally and of the same material as the first polarizer 21. That is, the support portion 31 and the first polarizer 21 are an integrated structure formed by cutting a same polarizer baseboard, so that the difficulty in assembling the modules is simplified, and the assembly tolerance between the support structure 30 and the first polarizer 21 is avoided, so that the heights of the support structure 30 and the first polarizer 21 are flush.

Alternatively, in some embodiments, the material of the support 31 may be different from the material of the first polarizer 21.

Alternatively, the first polarizer 21 is attached to the opposing substrate 12 by an optical adhesive layer. If the optical adhesive is integrated on the first polarizer 21, the support structure 30 is an protruding portion of the first polarizer 21. If the first polarizer 21 is attached to the opposing substrate 12 by an additional optical adhesive, the support structure 30 further includes the optical adhesive.

In addition, it should be understood that the number and size of the support structure 30 may be flexibly set according to the size of the display panel 10. For example, the display panel 10 may be relatively small in size, and one support structure 30 may be provided in the middle region on the ground side. When the size of the display panel 10 is large, a plurality of support structures 30 may be provided, and the support structures 30 are provided in the middle region on the ground side and in the edge regions on the right and left sides. The three support structures 30 illustrated in FIG. 4 are provided on the ground side as an example.

In one embodiment of the present application, in a top view of the display device 100, a boundary of the support structure 30 at a side close to the opposing substrate 12 is spaced apart from a boundary of the opposing substrate 12 by a vacant space 3a.

The avoidance opening 6a is provided on one side of the cell shielding layer 60 close to the first polarizer 21, and a support structure 30 is provided in the avoidance opening 6a. In the top view of the display device 100, in the side edge region of the opposing substrate 12 corresponding to the support structure 30, the cell shielding layer 60 is continuously attached to the opposing substrate 12 through the vacant space 3a.

It will be appreciated that, in the extending direction of the short side of the display panel 10, the support structure 30 does not fully cover the opposing substrate 12, so that the uncovered region of the opposing substrate 12 forms the vacant space 3a, and the corresponding avoidance opening 6a does not break the portion of the cell shielding layer 60 located on the upper surface of the opposing substrate 12. The formation of the vacant space 3a improves the attachment area of the cell shielding layer 60, thereby improving the stability of the attachment and the completeness of the covering, thereby improving the shielding effect. Next, the cell shielding layer 60 is made to be continuous on the whole upper surface of the opposing substrate 12 to build an overall attachment, so that the attachment efficiency can be improved.

Alternatively, in some embodiments of the present application, in a top view of the display device 100, the boundary of the support structure 30 at the side close to the opposing substrate 12 coincides with the boundary of the opposing substrate 12.

By arranging the boundaries of the support structure 30 and the opposing substrate 12 to coincide, the planar dimensions of the support structure 30 are enlarged, the area of the support structure 30 for supporting the front cover 41 is increased, and the occurrence of the abnormal sounds is further reduced.

Alternatively, in the region of the display device 100 at the ground side, the support structures 30 are arranged equidistantly. In the long side direction of the display panel 10, the width of each support structure 30 is between 10 mm and 20 mm, for example, 10 mm, 11 mm, 12 mm, 13 mm, 14 mm, 15 mm, 16 mm, 17 mm, 18 mm, 19 mm, or 20 mm.

It will be appreciated that the planar dimensions of the support structure 30 may be appropriately adjusted according to the attachment requirements of the cell shielding layer 60 and the support of the front cover 41, and there is no strict limitations on this in the embodiments of the present application.

Figure 6:
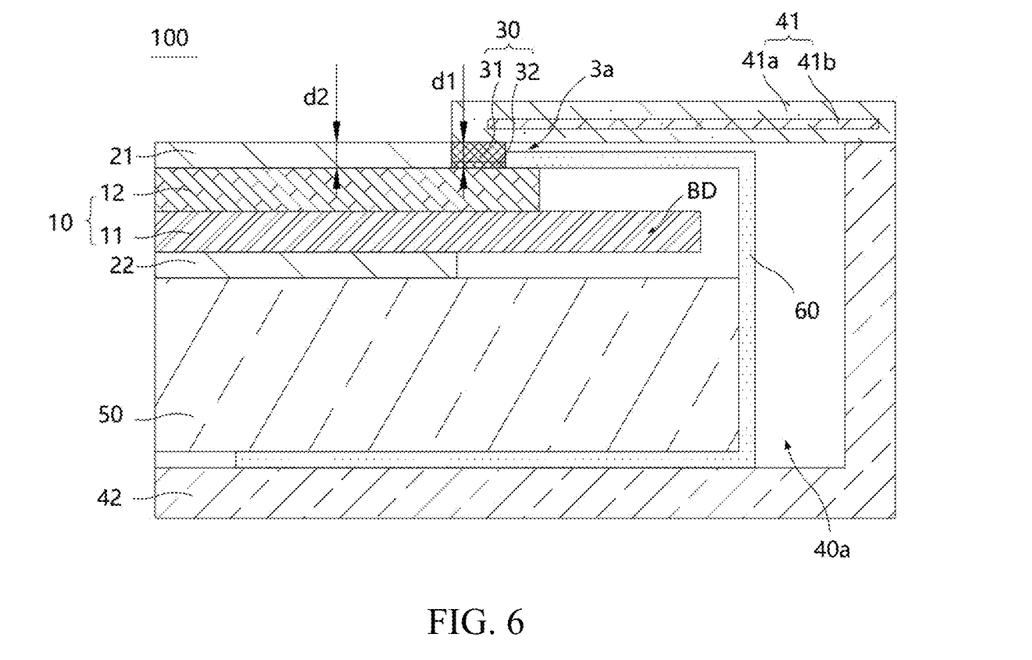
FIG. 6 is a schematic diagram showing structure of the display device according to another embodiment of the present application.
Figure 7:
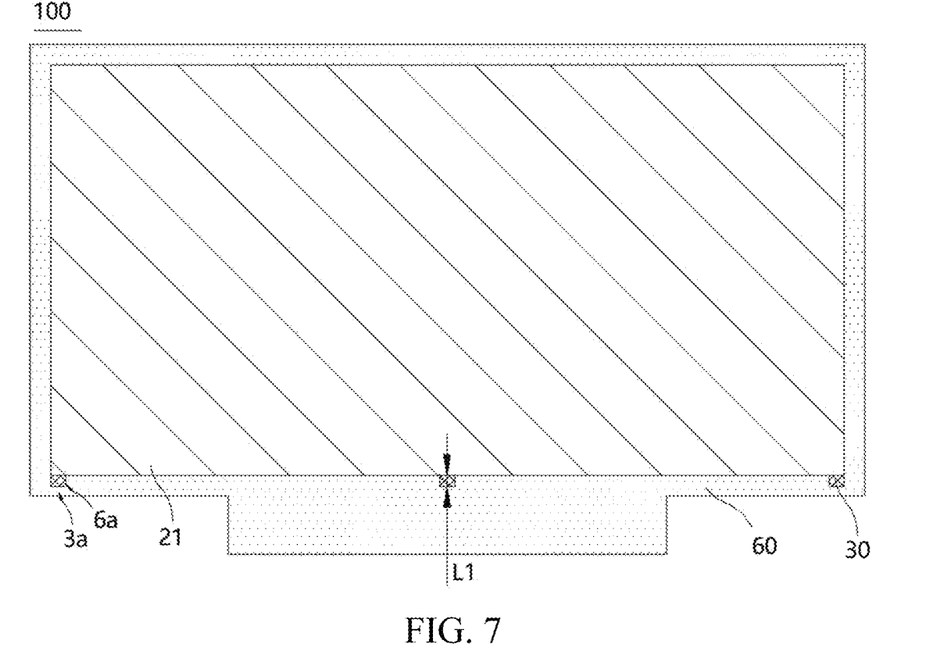
FIG. 7 is a top plan view of the display device with the front cover and the bottom case removed according to another embodiment of the present application.

The embodiments shown in FIGS. 6 and 7 differ from those shown in FIGS. 4 and 5. In FIGS. 6 and 7, the parts different from those of the above-described embodiments will be described in order to avoid redundancy.

Referring to FIGS. 6 and 7, in one embodiment of the present application, the support structure 30 and the first polarizer 21 are provided independently of each other.

That is, the support structure 30 and the first polarizer 21 are each fixed to the side of the opposing substrate 12 by separate steps. Wherein the support structure 30 and the first polarizer 21 are provided independently of each other, it is advantageous that the support structure 30 has a wider range of options for its material and structure, which provides better flexibility and functional pertinence.

In one embodiment of the present application, the distance between the support structure 30 and the first polarizer 21 is less than or equal to 0.15 mm.

The distance between the support structure 30 and the first polarizer 21 is set to be not more than 0.15 mm, so as to better ensure that the front cover 41 and the first polarizer 21 do not scratch each other due to a vertical misalignment therebetween. The smaller the distance between the support structure 30 and the first polarizer 21, the more likely the scratch is prevented.

Alternatively, the distance between the support structure 30 and the first polarizer 21 may be 0 mm, 0.01 mm, 0.02 mm, 0.03 mm, 0.04 mm, 0.05 mm, 0.06 mm, 0.07 mm, 0.08 mm, 0.09 mm, 0.10 mm, 0.11 mm, 0.12 mm, 0.13 mm, 0.14 mm, or 0.15 mm.

In one embodiment of the present application, the support structure 30 includes an adhesive layer 32 and a support portion 31 attached to the opposing substrate 12 by the adhesive layer 32.

The adhesive layer 32 is a glue layer, and the support structure 30 is fixed to the opposing substrate 12 by adhesive bonding. In some embodiments, the adhesive layer 32 is a welding layer and the support structure 30 may also be welded to the side of the opposing substrate 12.

In addition, the support structure 30 may be a positioning structure when performing the operation of attaching the first polarizer 21, that is, the support structure 30 may be taken as a reference and the first polarizer 21 may be attached by directly contacting the support structure 30, which may reduce the assembly tolerance.

Alternatively, the material of the support portion 31 is a flexible material. As the support portion 31 is a flexible material, such as PET, rubber, foam, or the like, it has good cushioning performance and can absorb external stress. Next, when the support portion 31 is slightly higher than the first polarizer 21 (the difference between the first distance d1 and the second distance d2 is not greater than 0.05 mm), the front cover 41 presses the support portion 31 down slightly, and the support portion 31 is slightly deformed, thereby improving the sealing effect. At the same time, due to the pressing of the front cover 41, the adhesive layer 32 adheres more closely to the support portion 31 and the opposing substrate 12, respectively, thereby improving the fastness of the adhesive.

Alternatively, the elastic modulus of the support portion 31 is between 10 MPa and 4000 MPa, so that the support portion 31 has a cushioning property while having a good supporting property. For example, the elastic modulus of the support portion 31 may be 10 MPa, 50 MPa, 100 MPa, 200 MPa, 300 MPa, 400 MPa, 500 MPa, 600 MPa, 700 MPa, 800 MPa, 900 MPa, 1000 MPa, 1500 MPa, 2000 MPa, 2500 MPa, 3000 MPa, 3500 MPa, or 4000 MPa.

In some embodiments of the present application, the material of the support portion 31 may also be a hard material, such as ceramic or alloy. The support portion 31 employs a support material to improve the supportability and wear resistance of the support structure 30.

Alternatively, the elastic modulus of the support portion 31 is larger than that of the first polarizer 21, that is, the hardness of the support structure 30 is larger than that of the first polarizer 21, and the support structure 30 has better supportability to prevent the front cover 41 from pressing down.

Alternatively, the elastic modulus of the support 31 is greater than or equal to 70 Gpa, and may be, for example, 70 Gpa, 71 Gpa, 72 Gpa, 73 Gpa, 74 Gpa, 75 Gpa, 76 Gpa, 77 Gpa, 78 Gpa, 79 Gpa, 80 Gpa, 90 Gpa, 100 Gpa, 110 Gpa, 120 Gpa, 130 Gpa, 140 Gpa, 150 Gpa, 160 Gpa, 170 Gpa, 180 Gpa, 190 Gpa, or 200 Gpa.

Figure 8:
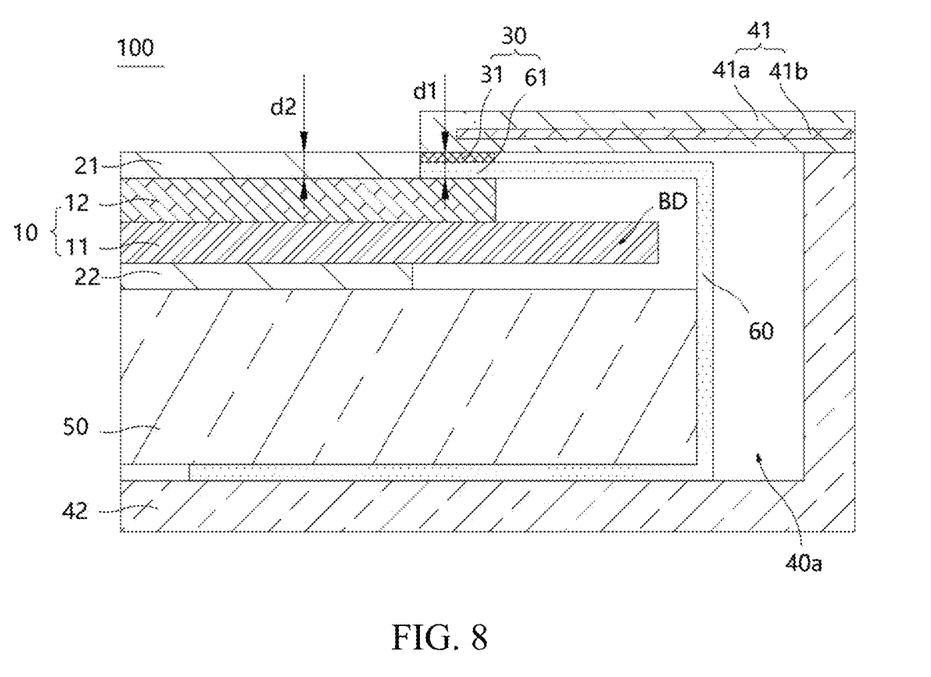
FIG. 8 is a schematic diagram showing structure of the display device according to still another embodiment of the present application.
Figure 9:
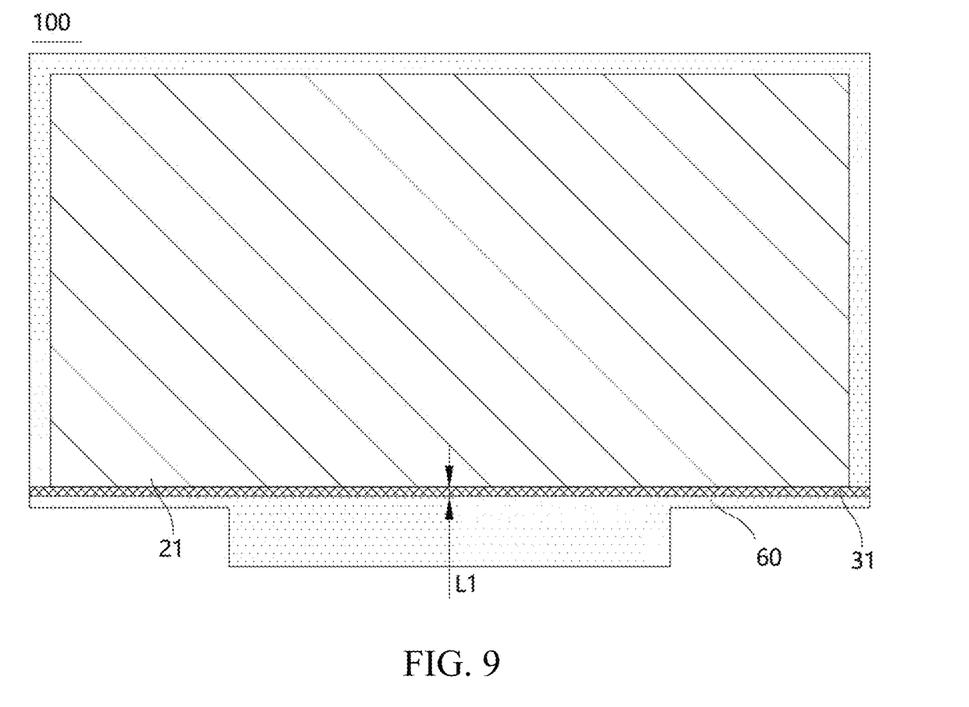
FIG. 9 is a top plan view of the display device with the front cover and the bottom case removed according to still another embodiment of the present application.

The embodiments shown in FIGS. 8 and 9 differ from those shown in FIGS. 6 and 7. In FIGS. 8 and 9, the parts different from those of the above-described embodiments will be described in order to avoid redundancy.

Referring to FIGS. 8 and 9, in one embodiment of the present application, the cell shielding layer 60 includes a first portion 61 attached to a side of the opposing substrate 12 away from the array substrate 11.

The support structure 30 includes a first portion 61 and a support portion 31 integrated on the first portion 61.

It will be appreciated that the integration of the support structure 30 on the cell shielding layer 60 can simplify the assembly process, and the attachment of the support structure 30 and the cell shielding layer 60 can be accomplished by a single attachment process. In addition, the continuity of the entire cell shielding layer 60 can be improved, and the attachment process of the cell shielding layer 60 can be facilitated. At the same time, the shielding area and the attachment area of the cell shielding layer 60 can be improved, thereby improving the light-shielding effect and the fastness of the attachment.

Alternatively, in the top view of the display device 100, the support portion 31 is elongated and extends along the side direction of the first polarizer 21.

Alternatively, the support portion 31 extends along the long side direction. The entire support portion 31 is provided on the ground side, thereby greatly improving the support of the front cover 41 and greatly reducing the likelihood that the front cover 41 and the first polarizer 21 scratch each other. The long side of the support portion 31 may coincide with the long side of the opposing substrate 12, or the long side of the support portion 31 may be located inside the long side of the opposing substrate 12.

In one embodiment of the present application, the support portion 31 is integrated on the side of the first portion 61 of the cell shielding layer 60 away from the array substrate 11.

When the support portion 31 is provided on the side facing toward the front cover 41, on the one hand, the front cover 41 may be directly supported by a suitable material according to different functional requirements, for example, a flexible material or a hard material according to the above-described embodiments, on the other hand, the vertical distance between the cell shielding layer 60 and the opposing substrate 12 can be reduced, thereby saving some space.

Figure 10:
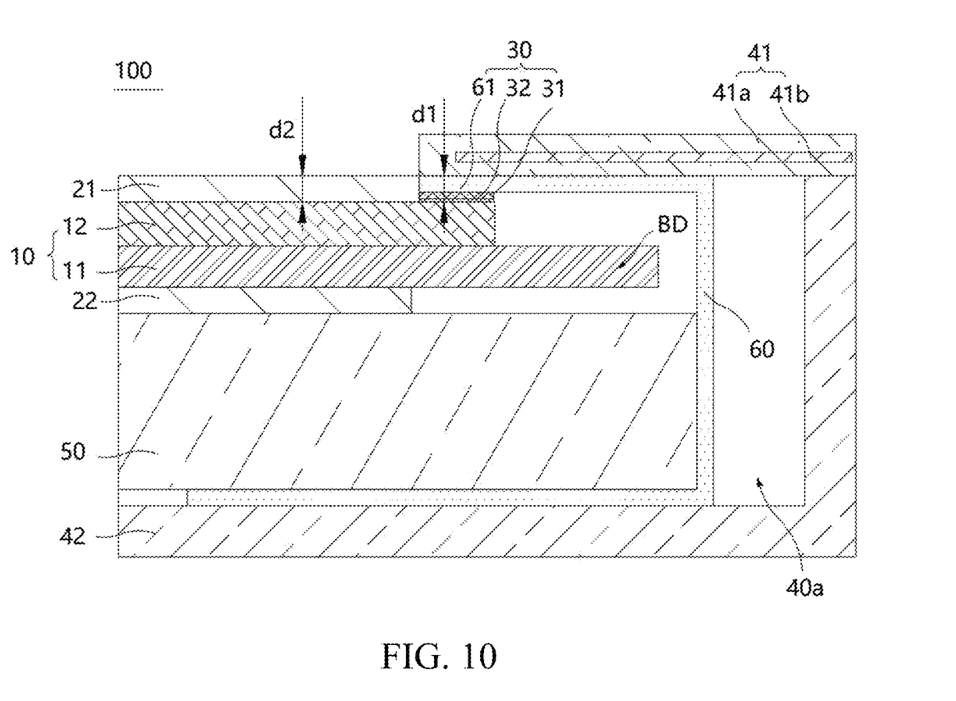
FIG. 10 is a schematic diagram showing structure of the display device according to still another embodiment of the present application.
Figure 11:
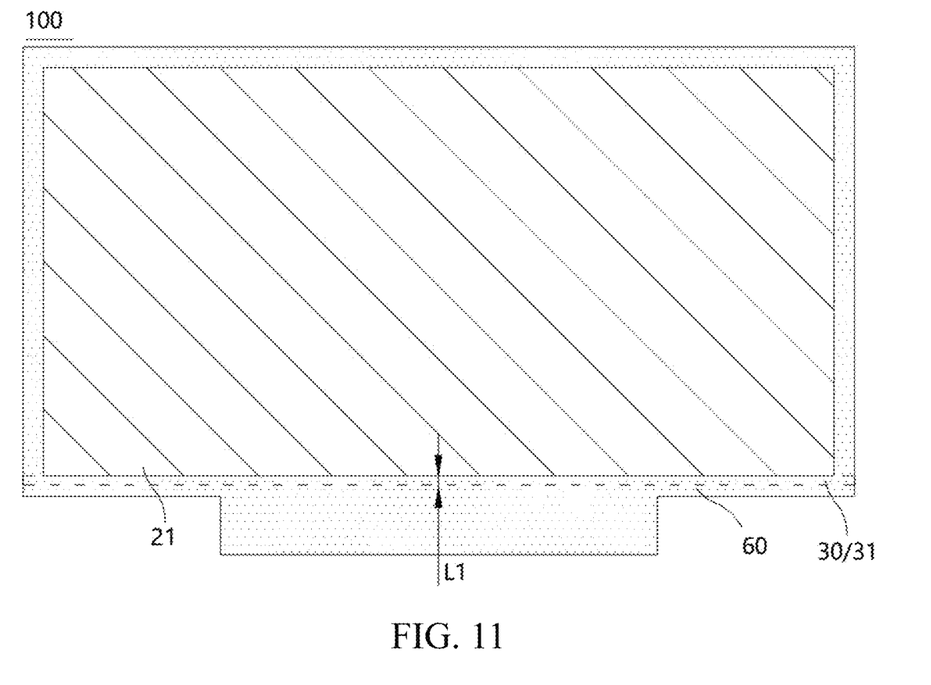
FIG. 11 is a top plan view of the display device with the front cover and the bottom case removed according to still another embodiment of the present application.

The embodiments shown in FIGS. 10 and 11 differ from those shown in FIGS. 8 and 9. In FIGS. 10 and 11, the parts different from those of the above-described embodiments will be described in order to avoid repeating the description.

Referring to FIGS. 10 and 11, in one embodiment of the present application, the support portion 31 is integrated on the side of the first portion of the edge covering shielding layer 60 adjacent to the array substrate 11. The support structure 30 further includes an adhesive layer 32 connected between the support portion 31 and the opposing substrate 12.

In this case, the supporting portion 31 is provided on the side of the cell shielding layer 60 close to the array substrate 11, so that the cell shielding layer 60 covers the support portion 31, thereby improving the overall appearance.

A display device according to the embodiments of the present invention is provided with a support structure on a side of the opposed substrate away from the array substrate and on a side of the first polarizer close to the edge of the opposed substrate. In a direction perpendicular to the panel surface of the display panel, a distance from a surface of the support structure away from the array substrate to a surface of the opposing substrate away from the array substrate is a first distance, a distance from a surface of the first polarizer away from the array substrate to the surface of the opposing substrate away from the array substrate is a second distance, and the first distance is greater than or equal to the second distance. That is, the display device according to the embodiments of the present application has an additional support structure on the opposing substrate to support the front cover, so that when the front cover moves relatively, even if the front cover disengages from the first polarizer, the front cover is still supported by the support structure, thereby reducing the likelihood that the front cover and the edge portion of the first polarizer scratch each other.

The present invention has been described in detail with reference to a display device according to an embodiment of the present invention, in which specific examples are used to illustrate the principles and embodiments of the present invention. The description of the above embodiments is merely provided to assist in understanding the method of the present application and the core concepts thereof. At the same time, variations will occur to those skilled in the art in both the detailed description and the scope of application in accordance with the teachings of the present application. In view of the foregoing, the present description should not be construed as limiting the application.

What is claimed is:

1. A display device, comprising:
   a display panel comprising an array substrate and an opposing substrate disposed opposite to the array substrate;
   a first polarizer disposed on a side of the opposing substrate away from the array substrate;
   a support structure disposed on the side of the opposing substrate away from the array substrate and on a side of the first polarizer close to an edge of the opposing substrate; and
   a front cover disposed on a side of the support structure and the first polarizer away from the array substrate, the front cover covering an edge region of the first polarizer and the support structure;
   wherein in a direction perpendicular to a panel surface of the display panel, a distance from one surface of the support structure away from the array substrate to one surface of the opposing substrate away from the array substrate is a first distance, a distance from one surface of the first polarizer away from the array substrate to the surface of the opposing substrate away from the array substrate is a second distance, and the first distance is greater than or equal to the second distance;
   wherein the support structure comprises a support portion protruding from the first polarizer towards an edge of the opposing substrate in a top view of the display device;
   wherein in the top view of the display device, a boundary of the support structure at a side close to the opposing substrate is spaced apart from a boundary of the opposing substrate by a vacant space;
   wherein the display device further comprises a cell shielding layer disposed on an outer periphery of the first polarizer, the front cover covers the cell shielding layer, a portion of the cell shielding layer is attached to the side of the opposing substrate away from the array substrate, an avoidance opening is provided on a side of the cell shielding layer close to the first polarizer, and the support structure is provided in the avoidance opening; and
   in the top view of the display device, in a side edge region of the opposing substrate corresponding to the support structure, the cell shielding layer is continuously attached to the opposing substrate through the vacant space.

2. The display device according to claim 1, wherein the support structure and the first polarizer are provided independently of each other.

3. The display device according to claim 2, wherein a distance between the support structure and the first polarizer is less than or equal to 0.15 mm.

4. The display device according to claim 3, wherein the support structure includes a support portion and an adhesive layer, and the support portion is attached to the opposing substrate by the adhesive layer.

5. The display device according to claim 1, wherein the support structure is located at least on one side of the first polarizer close to a bonding region of the array substrate.

6. The display device according to claim 1, wherein the first distance is at most 0.05 mm greater than the second distance.

7. The display device according to claim 1, further comprising a backlight module, a second polarizer, a cell shielding layer, and a bottom case, wherein the second polarizer is disposed on a side of the array substrate away from the opposing substrate, the backlight module is disposed on a side of the second polarizer away from the display panel, the cell shielding layer is disposed on an outer periphery of the first polarizer, one side of the cell shielding layer partially covers the side of the opposing substrate away from the array substrate, and the other side of the cell shielding layer is partially folded to follow a side surface of the backlight module to a back surface of the backlight module; and
   an accommodating groove is disposed in the bottom case, the backlight module, the display panel and the cell shielding layer are disposed in the accommodating groove, the front cover covers the cell shielding layer, and the front cover is connected to side walls of the bottom case.

8. A display device, comprising:
   a display panel comprising an array substrate and an opposing substrate disposed opposite to the array substrate;
   a first polarizer disposed on a side of the opposing substrate away from the array substrate;
   a support structure disposed on the side of the opposing substrate away from the array substrate and on a side of the first polarizer close to an edge of the opposing substrate; and
   a front cover disposed on a side of the support structure and the first polarizer away from the array substrate, the front cover covering an edge region of the first polarizer and the support structure;
   wherein in a direction perpendicular to a panel surface of the display panel, a distance from one surface of the support structure away from the array substrate to one surface of the opposing substrate away from the array substrate is a first distance, a distance from one surface of the first polarizer away from the array substrate to the surface of the opposing substrate away from the array substrate is a second distance, and the first distance is greater than or equal to the second distance;
   wherein the support structure and the first polarizer are provided independently of each other;
   wherein the display device further comprises a cell shielding layer disposed on an outer periphery of the first polarizer, the front cover covering the cell shielding layer, the cell shielding layer comprising a first portion attached on the side of the opposing substrate away from the array substrate; and
   the support structure comprises a support portion integrated on the first portion;
   wherein the support portion is integrated on a side of the first portion of the cell shielding layer close to the array substrate, and the support structure further comprises an adhesive layer connected between the support portion and the opposing substrate.

9. The display device according to claim 8, wherein in a top view of the display device, the support portion is elongated and extends along a side direction of the first polarizer.

* * * * *